United States Patent
Morishita et al.

(10) Patent No.: US 11,584,651 B2
(45) Date of Patent: Feb. 21, 2023

(54) POROUS CARBON AND METHOD OF MANUFACTURING SAME

(75) Inventors: Takahiro Morishita, Osaka (JP); Hironori Orikasa, Osaka (JP); Makoto Tatsumi, Kanonji (JP); Naoto Ohta, Kanonji (JP); Masaki Okada, Kanonji (JP)

(73) Assignee: TOYO TANSO CO., LTD., Osaka (JP)

( * ) Notice: Subject to any disclaimer, the term of this patent is extended or adjusted under 35 U.S.C. 154(b) by 680 days.

(21) Appl. No.: 14/002,425

(22) PCT Filed: Mar. 9, 2012

(86) PCT No.: PCT/JP2012/056075
§ 371 (c)(1),
(2), (4) Date: Aug. 30, 2013

(87) PCT Pub. No.: WO2012/121363
PCT Pub. Date: Sep. 13, 2012

(65) Prior Publication Data
US 2013/0330504 A1 Dec. 12, 2013

(30) Foreign Application Priority Data

Mar. 9, 2011 (JP) .............................. JP2011-051830
Mar. 9, 2011 (JP) .............................. JP2011-051831
Mar. 9, 2011 (JP) .............................. JP2011-051832

(51) Int. Cl.
*B32B 9/00* (2006.01)
*C01B 32/30* (2017.01)
(Continued)

(52) U.S. Cl.
CPC ................ *C01B 32/30* (2017.08); *B32B 3/12* (2013.01); *C01B 32/00* (2017.08); *C01B 32/318* (2017.08);
(Continued)

(58) Field of Classification Search
CPC .. Y10T 428/30; C01B 31/04; B32B 2307/704
(Continued)

(56) References Cited

U.S. PATENT DOCUMENTS 3,719,452 A * 3/1973 Accountius ............. C01B 32/00
264/29.5
2005/0169829 A1* 8/2005 Dai .......................... B01J 20/20
423/445 R
(Continued)

FOREIGN PATENT DOCUMENTS

JP 09-086914 A 3/1997
JP 2006-062954 A 3/2006
(Continued)

OTHER PUBLICATIONS

Japanese Office Action dated Dec. 10, 2014, issued in corresponding Japanese Patent Application No. 2011-051830, w/English translation (11 pages).
(Continued)

*Primary Examiner* — Daniel H Miller
(74) *Attorney, Agent, or Firm* — Rankin, Hill & Clark LLP (57) ABSTRACT

A porous carbon that has an extremely high specific surface area while being crystalline, and a method of manufacturing the porous carbon are provided.

A porous carbon has mesopores 4 and a carbonaceous wall 3 constituting an outer wall of the mesopores 4, wherein the carbonaceous wall 3 has a portion forming a layered structure. The porous carbon is fabricated by mixing a polyamic acid resin 1 as a carbon precursor with magnesium oxide 2 as template particles; heat-treating the mixture in a nitrogen atmosphere at 1000° C. for 1 hour to cause the polyamic acid resin to undergo heat decomposition; washing the resultant sample with a sulfuric acid solution at a concentration of 1
(Continued)

mol/L to dissolve MgO away; and heat-treating the non-crystalline porous carbon in a nitrogen atmosphere at 2500° C.

27 Claims, 8 Drawing Sheets

(51) Int. Cl.
*H01G 11/34* (2013.01)
*H01G 11/24* (2013.01)
*C01B 32/00* (2017.01)
*C01B 32/348* (2017.01)
*C04B 35/524* (2006.01)
*C04B 38/04* (2006.01)
*C01B 32/318* (2017.01)
*B32B 3/12* (2006.01)
*H01M 4/587* (2010.01)
*C04B 111/00* (2006.01)

(52) U.S. Cl.
CPC .......... *C01B 32/348* (2017.08); *C04B 35/524* (2013.01); *C04B 38/04* (2013.01); *H01G 11/24* (2013.01); *H01G 11/34* (2013.01); *C01P 2006/11* (2013.01); *C01P 2006/12* (2013.01); *C01P 2006/14* (2013.01); *C01P 2006/40* (2013.01); *C04B 2111/00612* (2013.01); *C04B 2235/3205* (2013.01); *C04B 2235/3206* (2013.01); *C04B 2235/3208* (2013.01); *C04B 2235/48* (2013.01); *H01M 4/587* (2013.01); *Y02E 60/13* (2013.01); *Y10T 428/24149* (2015.01); *Y10T 428/249979* (2015.04); *Y10T 428/27* (2015.01)

(58) Field of Classification Search
USPC .......................................... 428/408; 423/448
See application file for complete search history.

(56) References Cited

U.S. PATENT DOCUMENTS

| | | | |
|---|---|---|---|
| 2007/0116624 A1 | 5/2007 | Joo et al. | |
| 2009/0233792 A1 | 9/2009 | Kimijima et al. | |
| 2011/0082024 A1* | 4/2011 | Liu | A61K 9/51 502/5 |
| 2014/0099553 A1* | 4/2014 | Yu | C01B 32/05 429/231.8 |

FOREIGN PATENT DOCUMENTS

| | | |
|---|---|---|
| JP | 2006-347864 A | 12/2006 |
| JP | 2008-013394 A | 1/2008 |
| JP | 2008-535754 A | 9/2008 |
| JP | 2008-260678 A | 10/2008 |
| JP | 2009-221050 A | 10/2009 |
| JP | 2010-208887 A | 9/2010 |
| WO | 2010/104102 A1 | 9/2010 |
| WO | 2010/147087 A1 | 12/2010 |

OTHER PUBLICATIONS

Japanese Office Action dated Dec. 10, 2014, issued in corresponding Japanese Patent Application No. 2011-051831, w/English translation (11 pages).
International Search Report for PCT/JP2012/056075, dated Apr. 17, 2012.
Chinese Office Action dated Sep. 2, 2014, issued in corresponding CN application No. 201280012309.1 with English translation (28 pages).
Mochida, I. et al., "Method to produce mesoporous carbon", XP-002727478, Database CA [Online], Chemical Abstracts Service, Columbus, Ohio, US, Jan. 18, 2007, Cited in Extended European Search Report dated Jul. 31, 2014.
Numao, S. et al., "Synthesis and characterization of mesoporous carbon nano-dendrites with graphitic ultra-thin walls and their application to supercapacitor electrodes", Carbon, Elsevier, Oxford, GB, vol. 47, No. 1, Jan. 1, 2009, pp. 306-312, Cited in Extended European Search Report dated Jul. 31, 2014.
Xia, Y. et al., "Synthesis of Ordered Mesoporous Carbon and Nitrogen-Doped Carbon Materials with Graphitic Pore Walls via a Simple Chemical Vapor Deposition Method", Advanced Materials, Wiley-VCH Verlag GMBH & Co. KGAA, DE, vol. 16, No. 17, Sep. 3, 2004, pp. 1553-1558, Cited in Extended European Search Report dated Jul. 31, 2014.
Kim, T. W. et al., "A Synthetic Route to Ordered Mesoporous Carbon Materials with Graphitic Pore Walls", Angewandte Chemie International Edition, Wiley-VCH Verlag GMBH & Co. KGAA, DE, vol. 42, No. 36, Sep. 22, 2003, pp. 4375-4379, Cited in Extended European Search Report dated Jul. 31, 2014.
Extended European Search Report dated Jul. 31, 2014, issued in corresponding European Patent Application No. 12754345.2 (10 pages).
Wang, D.W., et al., "3D Aperiodic Hierarchical Porous Graphitic Carbon Material for High-Rate Electrochemical Capacitive Energy Storage", Angew. Chem. Int. Ed, 2008, vol. 47, pp. 373-376, cited in Japanese Notification of Reasons for Refusal dated Jul. 25, 2016. (4 pages).
Notification of Reasons for Refusal dated Jul. 27, 2016, issued in counterpart Japanese Application No. 2015-213462, with English translation. (6 pages).
Notification of Reasons for Refusal dated Aug. 9, 2016, issued in counterpart Japanese Application No. 2015-213463, with English translation. (4 pages).
Non-Final Office Action dated Sep. 14, 2017, issued in U.S. Appl. No. 14/764,355 (4 pages).
Gun Ei Chemical Industry Co., Ltd. (Gun Ei Kagaku Kogyo Kabushikigaisha), "Phenol imide GPI series, Product line up", Takasaki-shi, Gunma, Japan, (http://www.gunei-chemical.co.jp/product/phenolimide.html#) (2017).
Japan Phenolic Foam Association (Phenolic Foam Kyokai), Characteristics and capability of phenolic foam (Phenolic foam no tokucho to seinou), Tokyo, Japan, (http://www.jpfa.org/q_a/index.html) (2017).
Belenkov et al., "Scroll structure of carbon nanotubes obtained by the hydrothermal synthesis", Letters on materials 5 (4), 2015, pp. 459-462.
Inagaki et al., "Carbon Materials Science and Engineering—From Fundamentals to Applications," Jul. 2006, pp. 34-37.
Kobayashi et al. "Structure of Carbon II," The Carbon Society of Japan, vol. 1970 (1970), No. 60, pp. 21-30, retrievable from the Internet: <https://www.jstage.jst.go.jp/article/tanso1949/1970/60/1970_60_21/_pdf>.

* cited by examiner

POROUS CARBON AND METHOD OF MANUFACTURING SAME

TECHNICAL FIELD

The present invention relates to a porous carbon and a method of manufacturing the porous carbon. More particularly, the invention relates to a porous carbon having mesopores, and a method of manufacturing the same.

BACKGROUND ART

It has been well known that a porous carbon may be fabricated by a method in which a source material is heated and carbonized under a non-oxidizing atmosphere. Examples of the source material include: plant-originating source materials such as lignin, cellulosic substances including wool pulp, saw dust, coconut husk, cottonseed hull, and chaff, starchy substances including foxtail millet, Japanese barnyard millet, and con; mineral-originating source materials such as coal, tar, and petroleum pitch; and synthetic resins such as phenolic resin and polyacrylonitrile. The techniques for treating the carbonized substances (activated carbon) of these source materials with a chemical agent to activate the carbonized substances are also well known.

Recently, it has been confirmed that activated carbon having a specific surface area as high as 3000 $m^2/g$ can be obtained by using potassium hydroxide as an activator agent, mixing an organic resin with the activator agent, and heating it under a non-oxidizing atmosphere, which has drawn attention (see Patent Document 1).

However, for commercial use on an industrial scale, this method still has many problems as follows. For example, it requires an activator agent in an amount four times or more the amount of the organic resin. For that reason, the recovery and recycling of potassium is attempted, but the recovery rate is low, increasing the cost. Moreover, alkali metal evaporates during the heating process for the activation, contaminating or damaging the heating furnace, and it also can be a cause of erosion when used for various industrial materials. Furthermore, activated carbon treated with an alkali metal compound is highly flammable and therefore easily catches fire.

In view of such problems, there has been proposed a method of fabricating activated carbon that includes a step of mixing an organic resin with at least one alkaline-earth metal compound selected from an oxide, a hydroxide, a carbonate, and an organic salt of an alkaline-earth metal, and carbonizing the mixture in a non-oxidizing atmosphere (see Patent Document 2).

CITATION LIST

Patent Documents

[Patent Document 1]
Japanese Published Unexamined Patent Application No. 09-086914 A
[Patent Document 2]
Japanese Published Unexamined Patent Application No. 2006-062954 A

SUMMARY OF THE INVENTION

Problems to be Solved by the Invention

A porous carbon is manufactured by a variety of methods as described above, and an additional heating treatment of the porous carbon has been attempted for improving characteristics. However, when the porous carbon as described above is subjected to a heating treatment, there is the problem that not only crystallinity is not improved (graphitization cannot be realized), but also the specific surface area decreases, and thus far from expected improvement of characteristics, characteristics become worse than original characteristics.

Means for Solving the Problems

The present invention provides a porous carbon having mesopores and a carbonaceous wall constituting an outer wall of the mesopores, characterized in that: the carbonaceous wall has a portion forming a layered structure.

The portion of the carbonaceous wall, which forms a layered structure, may have developed crystallinity. This layered structure is normally generated by subjecting a carbon material to a heating treatment at a certain temperature or higher. However, the carbon material contracts during heating treatment, and therefore pores in the carbon material are collapsed to decrease the specific surface area, thus making it difficult to obtain a porous carbon having a high specific surface area while being crystalline. It is considered that since the porous carbon of the present invention has mesopores and a carbonaceous wall constituting an outer wall of the mesopores, it resists contraction during heating treatment, so that a layered structure can be formed on the carbonaceous wall. That is, in the porous carbon of the present invention, mesopores exist, and therefore a decrease in specific surface area can be suppressed. Thus, the porous carbon of the present invention can be used in a variety of fields (e.g. gas adsorbing materials, negative electrode materials of nonaqueous electrolyte batteries, electrode materials of capacitors, etc,) because a crystalline portion grows while the specific surface area is kept large to a certain extent.

It is not necessary that the whole of the carbonaceous wall have a layered structure, and noncrystalline portions may partially exist.

In the present specification, the pores having a pore diameter of less than 2 nm are referred to as "micropores," and the pores having a pore diameter of from 2 nm to 50 nm are referred to as "mesopores".

It is desirable that the carbonaceous wall form a three-dimensional network structure.

When the carbonaceous wall forms a three-dimensional network structure, the porous carbon of the present invention can be applied even in the case where elasticity is required in the application of the porous carbon. When the porous carbon of the present invention is used as a gas adsorbent, the flow of a gas is not hindered, and therefore the gas adsorbing ability is enhanced. Further, when the porous carbon of the present invention is used as a negative electrode material of a nonaqueous electrolyte battery or an electrode material of a capacitor, lithium ions and the like are smoothly migrated.

It is desirable that the specific surface area be 200 $m^2/g$ or more.

If the specific surface area is less than 200 $m^2/g$, there is the problem that it is difficult to form a three-dimensional network structure, and the amount of the pores formed may be insufficient, leading to a reduction in gas adsorbing ability. On the other hand, it is desirable that the specific surface area be 1500 $m^2/g$ or less. If the specific surface area exceeds 1500 m²/g, the shape of the carbonaceous wall may not be retained, and mesopores may not be sufficiently formed.

It is desirable that the mesopores be open pores, and that the hollow portions be connected to each other.

In the case of the configuration described above, when the porous carbon of the present invention is used as a gas adsorbent, gas flow becomes smoother, so the porous carbon can capture gas more easily. When the porous carbon is used as a negative electrode material of a nonaqueous electrolyte battery or an electrode material of a capacitor, lithium ions and the like are smoothly migrated.

It is desirable that the capacity of the mesopores be 0.2 ml/g or more.

This is because when the capacity of the mesopores is less than 0.2 ml/g, it is difficult to secure the specific surface area, and the gas adsorbing ability at high relative pressure may be reduced.

It is desirable that the bulk density be from 0.1 g/cc to 1.0 g/cc.

When the bulk density is less than 0.1 g/cc, it is difficult to secure the specific surface area, and the shape of the carbonaceous wall may not be retained. On the other hand, when the bulk density is more than 1.0 g/cc, there is the problem that it is difficult to form a three-dimensional network structure, and formation of mesopores may be insufficient, leading to a reduction in gas adsorbing ability.

It is desirable that the thickness of the portion forming a layered structure be from 1 nm to 100 nm.

The interlayer distance between adjacent layers is about 0.33 nm, and the thickness of the portion forming a layered structure is increased when a large number of layers are formed, while the thickness of the portion forming a layered structure is decreased when only a small number of layers are formed. Here, in preparation of the porous carbon, when the amount of template particles is decreased, the thickness of the carbonaceous wall is increased, and a large number of layers are formed, so that the thickness of the portion forming a layered structure is increased, while when the amount of template particles is increased, the thickness of the carbonaceous wall is decreased, and only a small amount of layers are formed, so that the thickness of the portion forming a layered structure is decreased. When the thickness of the layered structure is less than 1 nm, growth of the crystalline portion may be insufficient. On the other hand, when the thickness is more than 100 nm, it is necessary to increase the time of heating treatment, elevate the heating temperature, or the like, and therefore it is difficult to conduct manufacturing, which may lead to deterioration of other characteristics of the porous carbon of the present invention.

The present invention provides a porous carbon having mesopores and a carbonaceous wall constituting an outer wall of the mesopores, characterized in that: a peak is present at a Bragg angle 2θ of 26.45° in an X-ray diffraction spectrum to a CuKα ray (wavelength 1.541 angstroms).

When a peak is present at a Bragg angle 2θ of 26.45° in the X-ray diffraction spectrum, it can be said that the carbonaceous wall is graphitized. Since mesopores exist, a decrease in specific surface area can be suppressed. Thus, the porous carbon can be used in a variety of fields (e.g. gas adsorbing materials, negative electrode materials of nonaqueous electrolyte batteries, electrode materials of capacitors, etc,) because graphitization is possible while the specific surface area is kept large to a certain extent.

It is not necessary that the whole of the carbonaceous wall be graphitized, and noncrystalline portions, which are not graphitized, may partially exist.

For a reason similar to the reason described above, it is desirable that the carbonaceous wall form a three-dimensional network structure, and that the specific surface area be from 200 m²/g to 1500 m²/g. It is desirable that the mesopores be open pores, that the hollow portions be connected to each other, and that the capacity of the mesopores be 0.2 ml/g or more. Further, it is desirable that the bulk density be from 0.1 g/cc to 1.0 g/cc, and that the carbonaceous wall have a portion forming a layered structure.

The present invention provides a porous carbon having mesopores and a carbonaceous wall constituting an outer wall of the mesopores, characterized in that: the specific resistance is $1.0 \times 10^2 \Omega \cdot cm$ or less.

In the case of the configuration described above, a decrease in specific surface area can be suppressed because mesopores exist, and moreover the specific resistance is as low as $1.0 \times 10^2 \Omega \cdot cm$ or less. Thus, the porous carbon of the present invention can be used in a variety of fields when the specific resistance can be reduced while the specific surface area is kept large to a certain extent.

Preferably the carbonaceous wall at least partially has a layered structure, and is crystalline. It is not necessary that the whole of the carbonaceous wall be crystalline, and noncrystalline portions may partially exist.

For a reason similar to the reason described above, it is desirable that the carbonaceous wall form a three-dimensional network structure, and that the specific surface area be from 200 m²/g to 1500 m²/g. It is desirable that the mesopores be open pores, that the hollow portions be connected to each other, and that the capacity of the mesopores be 0.2 ml/g or more. Further, it is desirable that the bulk density be from 0.1 g/cc to 1.0 g/cc, and that the carbonaceous wall have a portion forming a layered structure.

The present invention provides a method of manufacturing a porous carbon, characterized in that: a carbonaceous carbonized body having mesopores is heat-treated in a non-oxidizing atmosphere or a reduced-pressure atmosphere at a temperature equal to or higher than a temperature at which a noncrystalline carbon is crystallized.

It is desirable that the carbonaceous carbonized body be manufactured by the steps of: mixing a flowable material containing an organic resin with template particles comprising at least one alkaline-earth metal compound selected from the group consisting of an oxide, a hydroxide, a carbonate and an organic acid salt of an alkaline-earth metal, to prepare a mixture; carbonizing the mixture in a non-oxidizing atmosphere to prepare a carbonized substance; and removing the template particles in the carbonized substance.

According to this manufacturing method, a porous carbon having crystallinity can be manufactured without causing a decrease in specific surface area when a carbonaceous carbonized body having mesopores is heat-treated. It is presumed that a decrease in specific surface area results from contraction of carbon during heat treatment, and that the carbonaceous carbonized body has mesopores before heat treatment, and therefore resists contraction of carbon, so that a decrease in specific surface area is suppressed.

When a carbonaceous carbonized body is fabricated by the method, it is heat-treated at a temperature equal to or higher than a temperature at which a noncrystalline carbon is crystallized, and therefore when the porous carbon of the present invention is used in a high-temperature atmosphere (e.g. used as a gas adsorbing member in a high-temperature atmosphere), degeneration of the porous carbon can be prevented as long as the temperature is lower than a temperature at which a noncrystalline carbon is crystallized. The temperature at which crystallization occurs is preferably 800° C. or higher, more preferably about 2000° C. or higher. Particularly, there may be few cases where a porous carbon is used at 2000° C. or higher, and therefore the porous carbon of the present invention can be used for various applications.

Here, the diameter of the pores, the pore distribution of the porous carbon, and the thickness of the carbonaceous wall can be adjusted by varying the diameter of the template particles and the type of the organic resin. Therefore, by appropriately selecting the diameter of the template particles and the type of the organic resin, it becomes possible to fabricate a porous carbon having more uniform pore diameters and a greater pore capacity. Moreover, since the flowable material containing an organic resin is used as the carbon source and the porous carbon can be fabricated without an activation treatment process, so the resultant porous carbon has a very high purity.

The reason why an alkaline-earth metal compound is used for the template particles is that, because the alkaline-earth metal compound can be removed by a weak acid or hot water (that is, the template particles can be removed without using a strong acid), the properties of the porous carbon itself can be prevented from changing in the step of removing the template particles. The use of a weak acid has an advantage that the speed of the removing becomes faster. On the other hand, the use of hot water has an advantage that it is possible to prevent the acid from remaining as an impurity. In addition, the oxide solution in which the oxide is dissolved in the step of removing the template particles can be re-used as a source material, so the manufacturing cost of the porous carbon can be reduced.

It is desirable that the carbon yield of the flowable material be from 40% to 85%, and the diameters of the template particles be substantially the same as each other.

When the diameters of the template particles are substantially the same as each other as described above, the template particles are uniformly dispersed in the matrix (i.e., in the carbonized substance), so the variations in the gaps between the template particles become small. As a result, it is possible to obtain a three-dimensional network structure in which the thickness of the carbonaceous wall is nearly uniform. If the carbon yield of the flowable material is excessively small or excessively large (specifically, if the carbon yield of the flowable material is less than 40% or greater than 85%), carbon powder in which the three-dimensional network structure is not retained is produced. However, if the carbon yield is limited to from 40% to 85% as described above, it is possible to obtain a porous carbon having a three-dimensional network structure such that the locations in which the template particles have existed are turned into continuous pores after removing the template particles. Moreover, when the diameters of the template particles are substantially the same as each other, continuous pores having the same size are formed, and therefore, a spongy and substantially cage-like porous carbon can be fabricated.

It is desirable that the flowable material show flowability at a temperature of 200° C. or lower. Specifically, an example of the flowable material is at least one selected from the group consisting of a polyimide containing at least one nitrogen or fluorine atom in its unit structure, a phenolic resin, and a pitch.

However, the flowable material is not limited to the one showing flowability at a temperature of 200° C. or lower. Even if the flowable material does not show flowability at a temperature of 200° C. or lower, the flowable material may be used in the present invention as long as the flowable material is a polymer material soluble in water or an organic solvent.

It is desirable that, in the step of removing the template particles, the remaining ratio of the template particles after the removing be restricted to 0.5% or less.

The reason is that when the remaining ratio of the template particles after the removing exceeds 0.5%, the region that cannot serve the role of the pores forms in a wide area because the amount of the template particles remaining in the mesopores is large.

Advantages of the Invention

The present invention exhibits significant advantageous effects of providing a porous carbon having an extremely high specific surface area although the carbon has a layered structure.

BRIEF DESCRIPTION OF THE DRAWINGS

FIG. 1 illustrates a manufacturing process of the present invention, wherein FIG. 1(a) shows a state in which a polyamic acid resin and magnesium oxide are mixed: FIG. 1(b) shows a mixture that has been heat-treated; and FIG. 1(c) shows porous carbon.

BEST MODE FOR CARRYING OUT THE INVENTION

Herein below, embodiments of the present invention will be described.

A porous carbon of the present invention is obtained in the following manner: an organic resin is wet- or dry-mixed with an oxide (template particles) in a solution or powder state, the mixture is carbonized in a non-oxidizing atmosphere or a reduced-pressure atmosphere at a temperature of, for example, 500° C. or higher, and then washed to remove the oxide, thereby fabricating a noncrystalline porous carbon (carbonaceous carbonized body). Thereafter, the noncrystalline porous carbon is heat-treated in a non-oxidizing atmosphere or a reduced-pressure atmosphere at a temperature equal to or higher than a temperature at which the noncrystalline porous carbon is crystallized (e.g., 2000° C.).

Preferably, the noncrystalline porous carbon has a multiplicity of mesopores having substantially the same particle diameter as each other, wherein micropores are formed at positions facing the mesopores in a carbonaceous wall formed between the mesopores. In the heat treatment of the noncrystalline porous carbon, a state in which a multiplicity of mesopores exist is maintained, and moreover, at least a part of the carbon portion (carbonaceous wall) forms a layered structure. Therefore, by this heat treatment, a porous carbon having developed crystallinity is obtained.

As the organic resin, a polyimide containing at least one nitrogen atom or fluorine atom in its unit structure, or a resin having a carbonization yield of from 40% by weight to 85% by weight, for example a phenol resin or a pitch, is suitably used.

Here, the polyimide containing at least one nitrogen or fluorine atom in its unit structure can be obtained by polycondensation of an acid component and a diamine component. However, in this case, it is necessary that either one of or both of the acid component and the diamine component contain at least one nitrogen atom or fluorine atom.

Specifically, a polyamic acid, which is the precursor of the polyimide, is deposited, and the solvent is removed by heating, to obtain a polyamic acid film. Next, the obtained polyamic acid film is subjected to heat imidization at 200° C. or higher, so that the polyimide can be manufactured.

Examples of the diamine include: aromatic diamines including 2,2-Bis(4-aminophenyl)hexafluoropropane, 2,2'-Bis(trifluoromethyl)-benzidine, and 4,4'-diaminooctafluorobiphenyl, and 3,3'-difluoro-4,4'-diaminodiphenylmethane, 3,3'-difluoro-4,4'-diaminodiphenylether, 3,3'-di(trifluoromethyl)-4,4'-diaminodiphenylether, 3,3'-difluoro-4,4'-diaminodiphenylpropane, 3,3'-difluoro-4,4'-diaminodiphenylhexafluoropropane, 3,3'-difluoro-4,4'-diaminobenzophenone, 3,3',5,5'-tetrafluoro-4,4'-diaminodiphenylmethane, 3,3',5,5'-tetra(trifluoromethyl)-4,4'-diaminodiphenylmethane, 3,3',5,5'-tetrafluoro-4,4'-diaminodiphenylpropane, 3,3',5,5'-tetra(trifluoromethyl)-4,4'-diaminodiphenylpropane, 3,3',5,5'-tetrafluoro-4,4'-diaminodiphenylhexafluoropropane, 1,3-diamino-5-(perfluorononenyloxy)benzene, 1,3-diamino-4-methyl-5-(perfluorononenyloxy)benzene, 1,3-diamino-4-methoxy-5-(perfluorononenyloxy)benzene, 1,3-diamino-2,4,6-trifluoro-5-(perfluorononenyloxy)benzene, 1,3-diamino-4-chloro-5-(perfluorononenyloxy)benzene, 1,3-diamino-4-pbromo-5-(perfluorononenyloxy)benzene, 1,2-diamino-4-(perfluorononenyloxy)benzene, 1,2-diamino-4-methyl-5-(perfluorononenyloxy)benzene, 1,2-diamino-4-methoxy-5-(perfluorononenyloxy)benzene, 1,2-diamino-3,4,6-trifluoro-5-(perfluorononenyloxy)benzene, 1,2-diamino-4-chloro-5-(perfluorononenyloxy)benzene, 1,2-diamino-4-bromo-5-(perfluorononenyloxy)benzene, 1,4-diamino-3-(perfluorononenyloxy)benzene, 1,4-diamino-2-methyl-5-(perfluorononenyloxy)benzene, 1,4-diamino-2-methoxy-5-(perfluorononenyloxy)benzene, 1,4-diamino-2,3,6-trifluoro-5-(perfluorononenyloxy)benzene, 1,4-diamino-2-chloro-5-(perfluorononenyloxy)benzene, 1,4-diamino-2-pbromo-5-(perfluorononenyloxy)benzene, 1,3-diamino-5-(perfluorohexenyloxy)benzene, 1,3-diamino-4-methyl-5-(perfluorohexenyloxy)benzene, 1,3-diamino-4-methoxy-5-(perfluorohexenyloxy)benzene, 1,3-diamino-2,4,6-trifluoro-5-(perfluorohexenyloxy)benzene, 1,3-diamino-4-chloro-5-(perfluorohexenyloxy)benzene, 1,3-diamino-4-bromo-5-(perfluorohexenyloxy)benzene, 1,2-diamino-4-(perfluorohexenyloxy)benzene, 1,2-diamino-4-methyl-5-(perfluorohexenyloxy)benzene, 1,2-diamino-4-methoxy-5-(perfluorohexenyloxy)benzene, 1,2-diamino-3,4,6-trifluoro-5-(perfluorohexenyloxy)benzene, 1,2-diamino-4-chloro-5-(perfluorohexenyloxy)benzene, 1,2-diamino-4-bromo-5-(perfluorohexenyloxy)benzene, 1,4-diamino-3-(perfluorohexenyloxy)benzene, 1,4-diamino-2-methyl-5-(perfluorohexenyloxy)benzene, 1,4-diamino-2-methoxy-5-(perfluorohexenyloxy)benzene, 1,4-diamino-2,3,6-trifluoro-5-(perfluorohexenyloxy)benzene, 1,4-diamino-2-chloro-5-(perfluorohexenyloxy)benzene, 1,4-diamino-2-bromo-5-(perfluorohexenyloxy)benzene; and p-phenylenediamine (PPD) and dioxydianiline, which do not contain fluorine atoms. It is also possible that two or more of the foregoing aromatic diamines may be used in combination as the diamine component.

Examples of the acid component include: 4,4-(hexafluoroisoproylidene)diphthalic anhydride (6FDA), which contains fluorine atoms; and 3,4,3',4'-biphenyltetracarboxylic dianhydride (BPDA) and pyromellitic dianhydride (PMDA), which contain no fluorine atom.

Examples of the organic solvent used as the solvent for the polyimide precursor include N-methyl-2-pyrrolidone and dimethylformamide.

The technique for imidization may follow either heat imidization or chemical imidization as indicated by known methods [for example, see "Shin Kobunshi Jikkengaku, 3, Kobunshi no Gosei Hanno (2)" (Experimental Polymer Science, New Edition, 3, Synthesis and reaction of polymer [2]), edited by Society of Polymer Science, Japan, Kyoritsu Shuppan, Tokyo, Mar. 28, 1996, p. 158]. The present invention is not limited to this method of imidization.

Furthermore, it is possible to use a resin having a carbon yield of 40% or higher, such as petroleum-based tar pitch and an acrylic resin, other than the polyimide.

Examples of the source material used as the abovementioned oxide include metal organic acids the state of which changes into magnesium oxide during the thermal decomposition process by a heat treatment (including magnesium citrate, magnesium oxalate, calcium citrate, and calcium oxalate) in addition to alkaline-earth metal oxides (magnesium oxide and calcium oxide).

As the cleaning solution for removing the oxide, it is preferable to use a dilute acid of 2 mol/L or lower of a common inorganic acid, such as hydrochloric acid, sulfuric acid, nitric acid, citric acid, acetic acid, and formic acid. It is also possible to use hot water of 80° C. or higher.

Preferably, carbonization of the aforementioned mixture is performed in a non-oxidizing atmosphere or a reduced-pressure atmosphere at a temperature of from 500° C. to 1500° C. The reason is as follows. Because the resin having a high carbon yield is a polymer, the carbonization is insufficient and the do not develop sufficiently at a temperature of lower than 500° C. On the other hand, at a temperature of 1500° C. or higher, the shrinkage is great and the oxide is carbonized and made into a large size; therefore, the pore size becomes small and the specific surface area becomes small. The non-oxidizing atmosphere is an argon atmosphere, a nitrogen atmosphere or the like, and the reduced-pressure atmosphere is an atmosphere at 133 Pa (1 torr) or less.

When the aforementioned noncrystalline porous carbon is heat-treated, it is necessary to perform the heat treatment in a non-oxidizing atmosphere or a reduced-pressure atmosphere. In this case, the non-oxidizing atmosphere is the argon atmosphere, the nitrogen atmosphere or the like as described above, and the reduced-pressure atmosphere is the atmosphere at 133 Pa (1 torr) or less as described above. Further, the heat treatment temperature is not limited as long as it is equal to or higher than a temperature at which a noncrystalline carbon is crystallized, but the heat treatment temperature is preferably 800° C. or higher, more desirably 2000° C. or higher for forming a layered structure (crystallization) smoothly and in a short time. However, if the temperature is excessively high, a waste of energy occurs, and therefore the heat treatment temperature is preferably 2500° C. or lower.

EXAMPLES

Example 1

Figure 1:
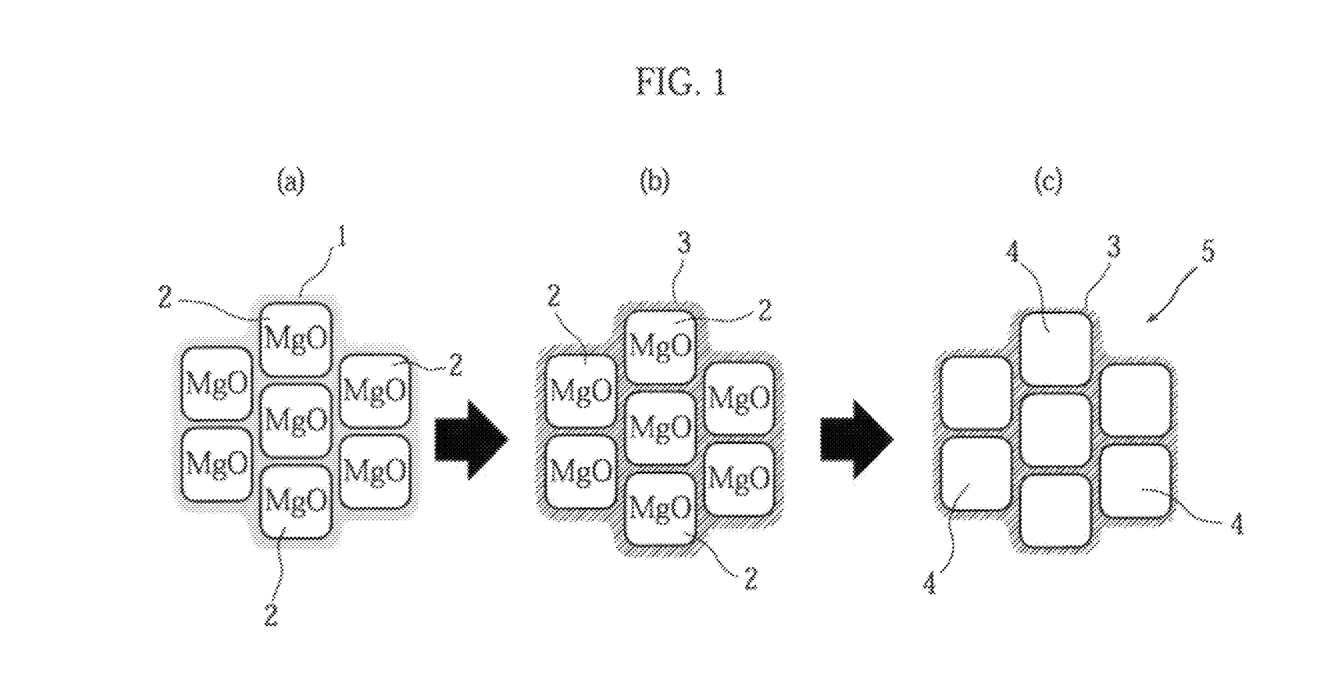

First, as illustrated in FIG. 1(a), a polyamic acid resin 1 (imide-based resin) as a carbon precursor and magnesium oxide 2 (MgO, average crystallite size 5 nm) as template particles were mixed at a weight ratio of 90:10. Next, as illustrated in FIG. 1(b), the mixture was heat-treated in a nitrogen atmosphere at 1000° C. for 1 hour, to allow the polyamic acid resin to undergo heat decomposition, so that a carbonized substance including a carbonaceous wall 3 was obtained. Then, as illustrated in FIG. 1(c), the resulting carbonized substance was washed with a sulfuric acid solution added at a concentration of 1 mol/L, to dissolve MgO away completely, whereby porous carbon 5 having a multiplicity of pores 4 was obtained. Lastly, the noncrystalline porous carbon was heat-treated in a nitrogen atmosphere at 2500° C. for 1 hour to obtain a porous carbon.

The porous carbon fabricated in this manner is hereinafter referred to as a present invention carbon A1.

Figure 2:
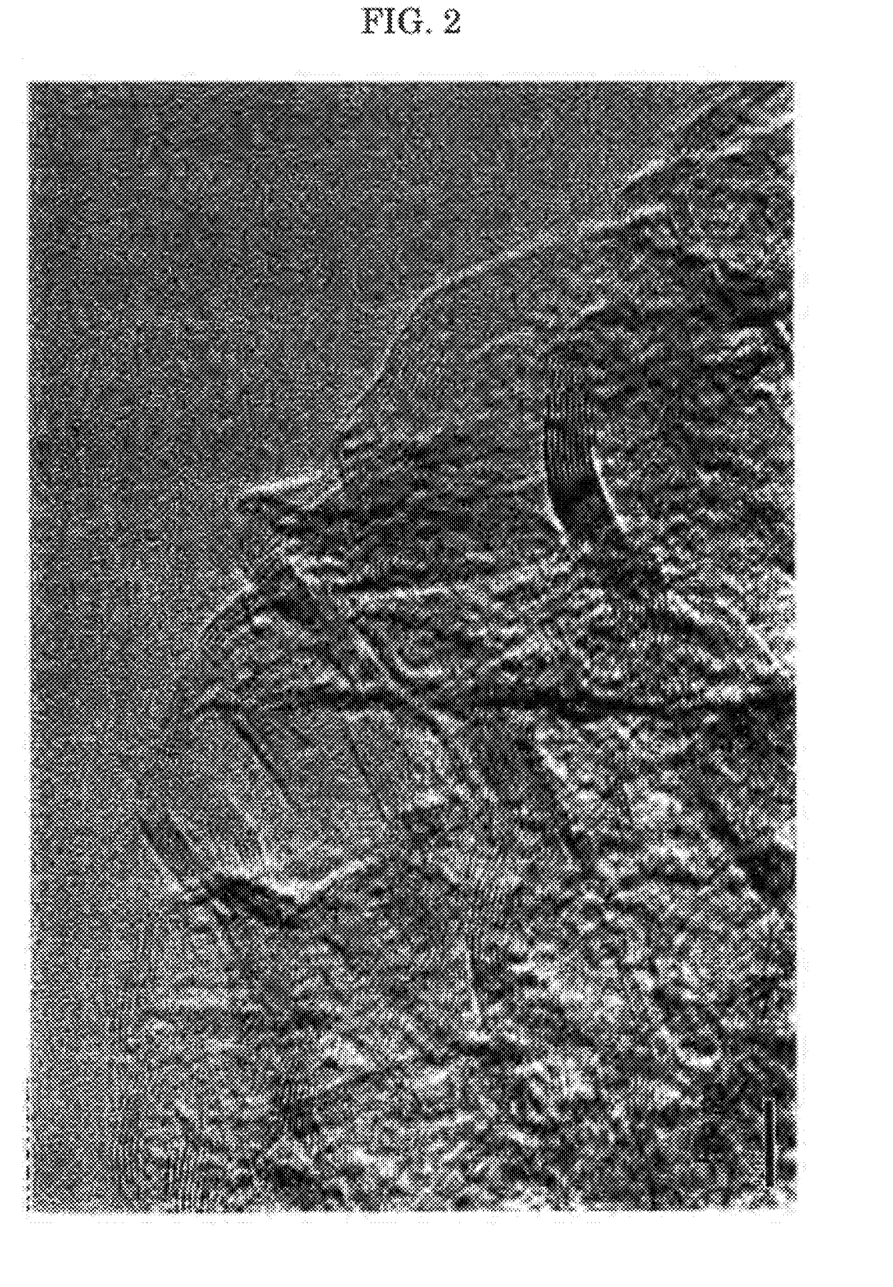
FIG. 2 is a STEM (scanning transmission electron microscope) photograph of a present invention carbon A1.

FIG. 2 shows a STEM (scanning transmission electron microscope) photograph of the present invention carbon A1. As clearly seen from FIG. 2, at least a part of the carbon portion of the present invention carbon A1 forms a layered shape, and accordingly it is observed that crystallinity of at least a part of the carbon portion is developed. That is, it is observed that in the present invention carbon A1, crystallinity of at least a part of the carbonaceous wall 3 is developed. The interlayer distance between adjacent layers is about 0.33 nm, and therefore in the case of a structure of 11 layers, the thickness of the carbon layer forming a layered shape is 3.3 nm (0.33 nm×[11−1]). It was observed that the present invention carbon A1 formed a three-dimensional network structure (spongy carbon form), and the mesopores were open pores, so that the hollow portions were connected to each other.

Example 2

A porous carbon was fabricated in the same manner as described in Example 1 above, except that the temperature for heat-treating a noncrystalline porous carbon was 2000° C.

The porous carbon fabricated in this manner is hereinafter referred to as a present invention carbon A2.

Figure 3:
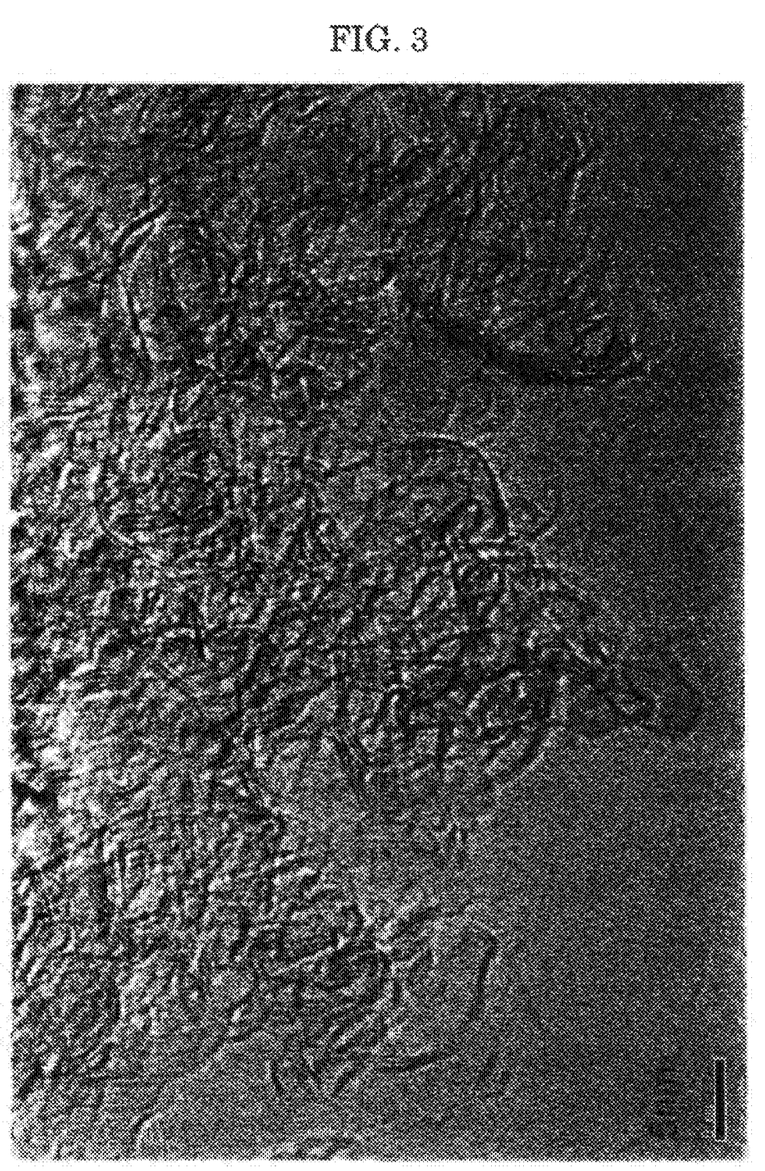
FIG. 3 is a STEM photograph of a present invention carbon A2.

FIG. 3 shows a STEM photograph of the present invention carbon A2. As clearly seen from FIG. 3, at least a part of the carbon portion of the present invention carbon A2 forms a layered shape, and accordingly it is observed that crystallinity of at least a part of the carbon portion is developed. It was also observed that the present invention carbon A2 formed a three-dimensional network structure (spongy carbon form), and the mesopores were open pores, so that the hollow portions were connected to each other.

Example 3

A porous carbon was fabricated in the same manner as described in Example 1 above, except that the temperature for heat-treating a noncrystalline porous carbon was 1400° C.

The porous carbon fabricated in this manner is hereinafter referred to as a present invention carbon A3.

Example 4

A porous carbon was fabricated in the same manner as described in Example 1 above, except that the temperature for heat-treating a noncrystalline porous carbon was 900° C.

The porous carbon fabricated in this manner is hereinafter referred to as a present invention carbon A4.

Figure 4:
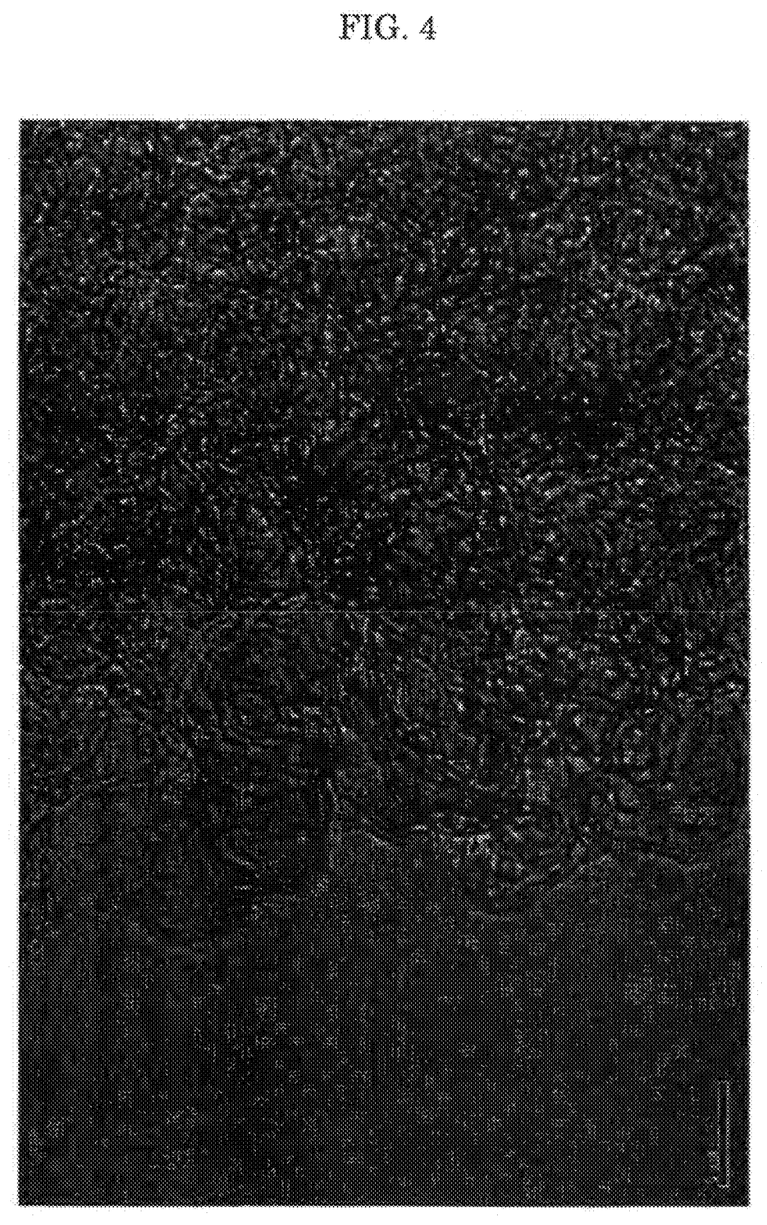
FIG. 4 is a STEM photograph of a present invention carbon A4.

FIG. 4 shows a STEM (scanning transmission electron microscope) photograph of the present invention carbon A4. As clearly seen from FIG. 4, at least a part of the carbon portion of the present invention carbon A4 forms a layered shape, and accordingly it is observed that crystallinity of at least a part of the carbon portion is developed. It was also observed that the present invention carbon A4 formed a three-dimensional network structure (spongy carbon form), and the mesopores were open pores, so that the hollow portions were connected to each other.

Comparative Example 1

A porous carbon was fabricated in the same manner as described in Example 1 above, except that as a carbon material before heat treatment, an activated carbon (reagent manufactured by Wako Pure Chemical Industries, Ltd.) was used in place of the noncrystalline porous carbon, and the activated carbon was heat-treated at 2000° C.

The porous carbon fabricated in this manner is hereinafter referred to as a present invention carbon Z1.

Comparative Example 2

A porous carbon was fabricated in the same manner as described in Example 1 above, except that as a carbon material before heat treatment, an activated carbon (reagent manufactured by Wako Pure Chemical Industries, Ltd.) was used in place of the noncrystalline porous carbon, and the activated carbon was heat-treated at 1400° C.

The porous carbon fabricated in this manner is hereinafter referred to as a present invention carbon Z2.

Comparative Example 3

A porous carbon was fabricated in the same manner as described in Example 1 above, except that as a carbon material before heat treatment, an activated carbon (reagent manufactured by Wako Pure Chemical Industries, Ltd.) was used in place of the noncrystalline porous carbon, and the activated carbon was not heat-treated.

The porous carbon fabricated in this manner is hereinafter referred to as a present invention carbon Z3.

Experiment 1

The relationship between the pressure and the amount of $N_2$ adsorbed (adsorption isotherm) was studied for the present invention carbons A1 to A4. The results are shown in FIG. 5.

In this experiment, measurements were made by a nitrogen adsorption method using a specific-surface area measuring device (Bellsorp 18, BEL Japan, Inc.). About 0.1 g of the sample was taken in a cell, degassed in a sample pretreatment section of the device at 300° C. for about 5 hours, and then measured.

Figure 5:
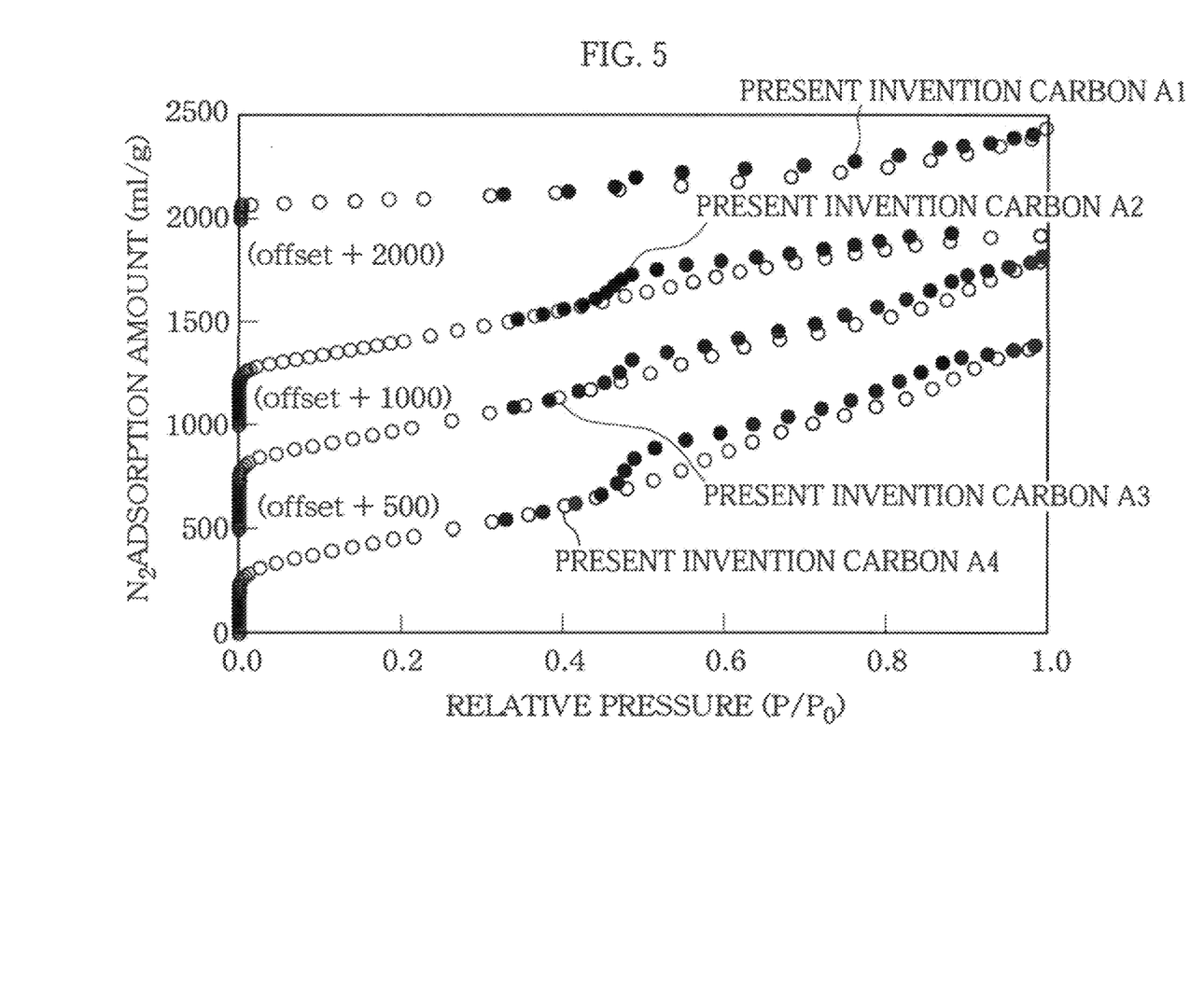
FIG. 5 is a graph showing the relationship of the relative pressure and the amount of $N_2$ adsorbed for the present invention carbons A1 to A4.

As clearly seen from FIG. 5, when the relative pressure is in the range of from 0 to 0.1, it is observed that the present invention carbons A3 and A4 adsorb large amounts of $N_2$ gas, while the present invention carbon A2 adsorbs a small amount of $N_2$ gas as compared to the present invention carbons A3 and A4, and the present invention carbon A1 adsorbs little $N_2$ gas. On the other hand, when the relative pressure is in the range exceeding 0.1, it is observed that the present invention carbons A1 and A2 adsorb small amounts of $N_2$ gas as compared to the present invention carbons A3 and A4, but sufficiently adsorb $N_2$ gas. The experiment 2 described below was conducted for examining the reason why these experiment results were obtained.

Experiment 2

For the present invention carbons A1 to A4 and comparative carbons Z1 to Z3, the BET specific surface area, the mesopore capacity and the micropore capacity were determined. The results are shown in Table 1. The BET specific surface area was calculated from the results of the adsorption isotherm using the BET method. The mesopore capacity was examined by the BJH (Berret-Joyner-Halenda) method. Further, the micropore capacity was examined by the HK (Horbath-Kawazoe) method.

A4, and particularly the capacity of micropores is significantly low. Thus, the gas absorbing ability is reduced regardless of whether the relative pressure is high or low, and particularly the capacity of micropores is significantly low, and therefore the gas absorbing ability when the relative pressure is low is particularly reduced.

Further, when the comparative carbons Z1 and Z2 are compared to the comparative carbon Z3, it is observed that micropores are significantly decreased due to the heat treatment. In contrast, when the present invention carbons A2, A3 and A4 are compared to one another, it is observed that by having mesopores, a decrease in micropores is suppressed even if the heat treatment temperature is elevated. However, for the present invention carbon A1 in which the heat treatment temperature is elevated to 2500° C., a decrease in micropores is observed.

It is considered that the results of Experiment 1 were obtained from the reason described above.

As described above, the present invention carbons A1 and A2 have a low gas absorbing ability as compared to the present invention carbons A3 and A4, but it is considered that the gas adsorbing ability is remarkably high as compared to a case where an activated carbon, which is used as a carbon material before heat treatment, is heat-treated. The reason for this is as follows. It is considered that for the comparative carbon Z1 formed by heat-treating an activated carbon, which is used as a carbon material before heat treatment, at 2000° C., the capacities of mesopores and micropores are extremely low, so that the gas adsorbing ability is significantly reduced.

TABLE 1

| Type of carbon | Type of carbon material before heat treatment | Heat treatment temperature (° C.) | BET Specific surface area ($m^2$/g) | Mesopore capacity (ml/g) | Micropore capacity (ml/g) |
| --- | --- | --- | --- | --- | --- |
| Present invention carbon A1 | Porous carbon | 2500 | 340 | 0.55 | 0.12 |
| Present invention carbon A2 | | 2000 | 1450 | 1.00 | 0.50 |
| Present invention carbon A3 | | 1400 | 1700 | 1.42 | 0.62 |
| Present invention carbon A4 | | 900 | 1640 | 1.59 | 0.59 |
| Comparative carbon Z1 | Activated carbon | 2000 | 12 | 0 | 0.02 |
| Comparative carbon Z2 | | 1400 | 300 | 0.01 or less | 0.10 |
| Comparative carbon Z3 | | None | 1600 | 0.02 | 0.56 |

As clearly seen from Table 1, for the present invention carbons A3 and A4 formed by heat-treating a porous carbon, which is used as a carbon material before heat treatment, at 900° C. or 1400° C., the capacities of mesopores having a high gas adsorbing ability when the relative pressure is high and micropores disposed at positions facing the mesopores and having a gas adsorbing ability when the relative pressure is low are both high. Therefore, for the present invention carbons A3 and A4, the gas adsorbing ability is enhanced regardless of whether the relative pressure is high or low.

On the other hand, for the present invention carbon A2 formed by heat-treating a porous carbon, which is used as a carbon material before heat treatment, at 2000° C., the capacities of mesopores and micropores are slightly low as compared to the present invention carbons A3 and A4, so that the gas adsorbing ability is slightly reduced regardless of whether the relative pressure is high or low. For the present invention carbon A1 formed by heat-treating a porous carbon, which is used as a carbon material before heat treatment, at 2500° C., the capacities of mesopores and micropores are low as compared to the present invention carbon A2 as well as the present invention carbons A3 and Thus, it is considered that the present invention carbons A1 and A2 can sufficiently exhibit an advantage of the carbon, such as a gas adsorbing ability, because a porous state is maintained by having mesopores, although at least a part of the carbon is crystallized.

For the present invention carbon A2, the capacities of mesopores and micropores are slightly low, and therefore the BET specific surface area is also slightly small, as compared to the present invention carbons A3 and A4. For the present invention carbon A1, the capacities of mesopores and micropores are further low, and therefore the BET specific surface area is also further small. However, the present invention carbons A1 and A2 have a remarkably large BET specific surface area as compared to the comparative carbon Z1 in which the capacities of mesopores and micropores are extremely low.

In addition, for enhancing the gas adsorbing ability or the like, the mesopore capacity is desired to be high, but is not limited to the gas adsorbing ability of the present invention carbon A1, i.e. 0.55 ml/g or more. It suffices that the gas adsorbing ability is 0.2 ml/g or more. It is considered that such a low mesopore capacity is obtained when the porous carbon is heat-treated at a temperature of higher than 2500° C.

Experiment 3

The bulk densities of the present invention carbons A1, A2 and A4 were examined. The results are shown in Table 2.

TABLE 2

| Type of carbon | Type of carbon material before heat treatment | Heat treatment temperature (° C.) | Bulk density (g/cc) |
|---|---|---|---|
| Present invention carbon A1 | Porous carbon | 2500 | 0.27 |
| Present invention carbon A2 | | 2000 | 0.15 |
| Present invention carbon A4 | | 900 | 0.14 |

As clearly seen from Table 2, it is observed that the present invention carbons A1 and A2 have a high bulk density as compared to the present invention carbon A4, and particularly the bulk density of the present invention carbon A1 is high. This is considered to be due to the fact that as described above, for the present invention carbons A1 and A2, the capacities of mesopores and micropores (capacity of the carbon portion) are low as compared to the present invention carbon A4, and particularly for the present invention carbon A1, the capacities of mesopores and micropores are very low.

Experiment 4

The pore size distribution (mesopore size distribution) in the present invention carbons A1, A2 and A4 was examined using the BJH method. The results are shown in FIGS. 6 to 8 (FIG. 6 shows the present invention carbon A1, FIG. 7 shows the present invention carbon A2, and FIG. 8 shows the present invention carbon A4).

Figure 6:
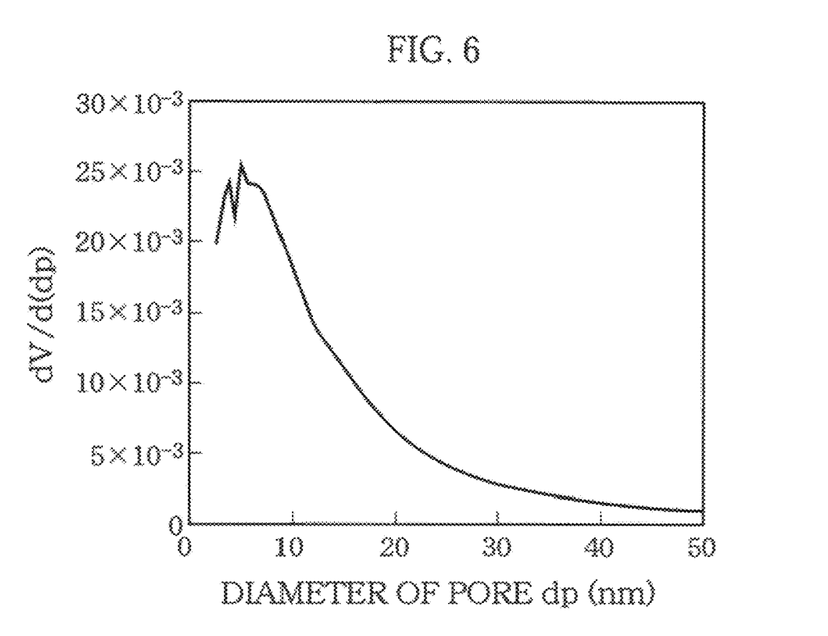
FIG. 6 is a graph showing the relationship between pore diameters and their proportions in the present invention carbon A1.
Figure 7:
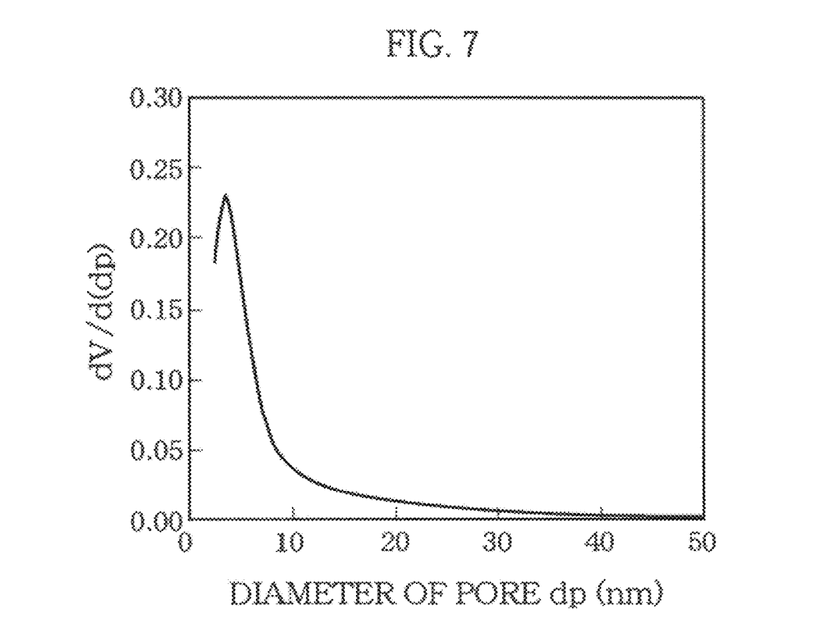
FIG. 7 is a graph showing the relationship between pore diameters and their proportions in the present invention carbon A2.
Figure 8:
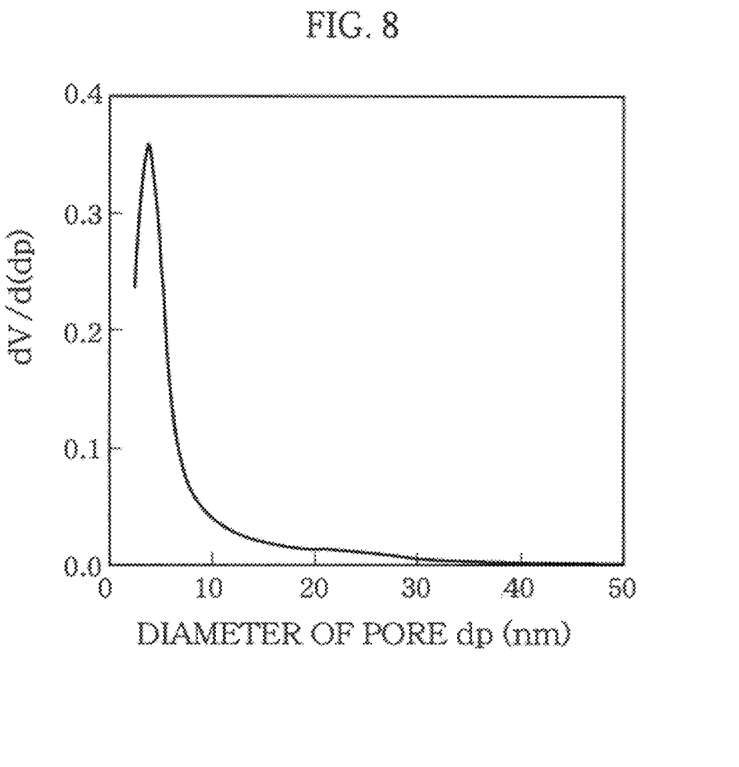
FIG. 8 is a graph showing the relationship between pore diameters and their proportions in the present invention carbon A4.

As clearly seen from FIGS. 6 to 8, the peak of the mesopore size in the present invention carbons A1. A2 and A4 is from 3 nm to 5 nm, and therefore the peak of the mesopore size is not changed by a difference in heat treatment temperature.

Experiment 5

The specific resistance in the present invention carbons A1 to A4 and the comparative carbons Z1 to Z3 was examined. The results are shown in Table 3. The experiment was conducted as follows. Each carbon and polytetrafluoroethylene (Teflon (registered trademark) 6J) manufactured by Du Pont) as a binder were physically mixed at a weight ratio of 80:20, acetone as a solvent was added to the mixture, and the mixture was processed into a sheet. For drying off the solvent, the sheet was dried at 120° C. for 5 hours to fabricate a sheet of 100 mm×100 mm×1 mm. The specific resistance of the sheet was measured using a four-terminal method.

TABLE 3

| Type of carbon | Type of carbon material before heat treatment | Heat treatment temperature (° C.) | Specific resistance (Ω · cm) |
|---|---|---|---|
| Present invention carbon A1 | Porous carbon | 2500 | 2.0 |
| Present invention carbon A2 | | 2000 | $3.1 \times 10^1$ |

TABLE 3-continued

| Type of carbon | Type of carbon material before heat treatment | Heat treatment temperature (° C.) | Specific resistance (Ω · cm) |
|---|---|---|---|
| Present invention carbon A3 | | 1400 | $1.0 \times 10^5$ |
| Present invention carbon A4 | | 900 | $3.5 \times 10^5$ |
| Comparative carbon Z1 | Activated carbon | 2000 | $8.0 \times 10^2$ |
| Comparative carbon Z2 | | 1400 | $3.8 \times 10^4$ |
| Comparative carbon Z3 | | None | $2.4 \times 10^5$ |

As clearly seen from Table 3, when the case is considered where a porous carbon is used as a carbon material before heat treatment, the present invention carbons A1 and A2, the heat treatment temperature of which is 2000° C. or higher, have a specific resistance of from 2.0 Ω·cm to $3.1 \times 10^1$ Ω·cm, whereas the present invention carbons A3 and A4, the heat treatment temperature of which is lower than 2000° C., have a specific resistance of from $1.0 \times 10^5$ Ω·cm to $3.5 \times 10^5$ Ω·cm. Therefore, it is observed that the present invention carbons A1 and A2 have a remarkably low specific resistance as compared to the present invention carbons A3 and A4.

On the other hand, when the case is considered where an activated carbon is used as a carbon material before heat treatment, the comparative carbon Z1, the heat treatment temperature of which is 2000° C. or higher, has a specific resistance of $8.0 \times 10^2$ Ω·cm whereas the comparative carbons Z2 and Z3, the heat treatment temperature of which is lower than 2000° C., have a specific resistance of from $3.8 \times 10^4$ cm to $2.4 \times 10^5$ Ω·cm. Therefore, the comparative carbon Z1 has a low specific resistance as compared the comparative carbons Z2 and Z3. However, it is observed that the comparative carbon Z1 has a high specific resistance when compared to the present invention carbons A1 and A2. The reason for this is not clear, but this is considered to be due to the fact that in the present invention carbons A1 and A2, there exist sufficient mesopores, so that a layered structure grows, whereas in the comparative carbon Z1, there exist little mesopores, so that a layered structure hardly grows.

A lower specific resistance is more preferable, but it is not necessary that the specific resistance be $3.1 \times 10^1$ Ω·cm or less, and use can be made in various fields as long as the specific resistance is $1.0 \times 10^2$ Ω·cm or less.

Experiment 6

X-ray diffraction (ray source CuKα) was performed for the present invention carbons A1 and A4. The results are shown in FIG. 9.

Figure 9:
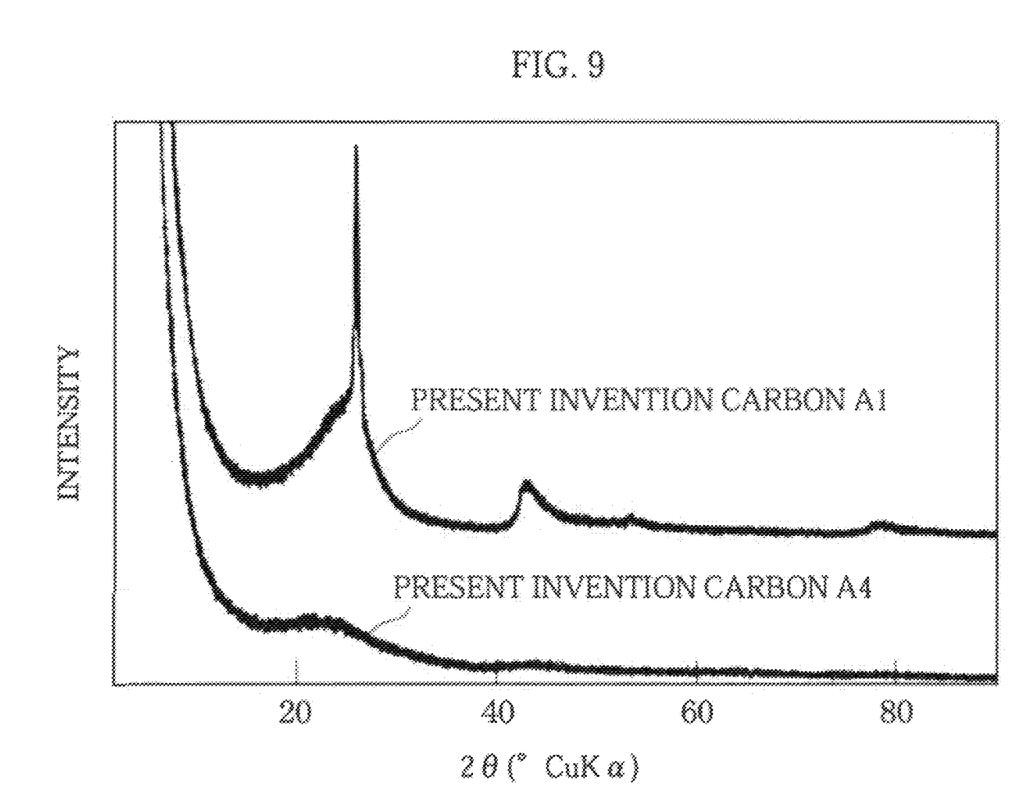
FIG. 9 shows X-ray diffraction charts of the present invention carbons A1 and A4.

As clearly seen from FIG. 9, the peak of graphite (002 plane) is evidently observed at a Bragg angle (2θ±0.2°) of 26.45° in the present invention carbon A1, whereas the peak of graphite (002 plane) is not much observed at a Bragg angle of 26.45° in the present invention carbon A4. Therefore, it is observed that carbon is graphitized in the present invention carbon A1, but carbon is not much graphitized in the present invention carbon A4.

When the microcrystal size was determined from the half-width of the peak in the X-ray diffraction result using a Scherrer's equation, the diameter of the microcrystal was about 30 nm.

INDUSTRIAL APPLICABILITY

The present invention is applicable to, for example, a gas adsorbent material, a negative electrode material of a non-aqueous electrolyte battery, and an electrode material of a capacitor.

DESCRIPTION OF REFERENCE NUMERALS

1—Polyamic acid resin (Imide-based resin)
2—Magnesium oxide
3—Carbonaceous wall
4—Mesopore
5—Porous carbon

The invention claimed is:

1. A porous carbon comprising:
mesopores,
a carbonaceous wall constituting an outer wall of the mesopores, the carbonaceous wall forming a mesh three-dimensional network structure, and
micropores,
wherein the micropores are each formed in a position facing the mesopores in the carbonaceous wall,
wherein the carbonaceous wall has a portion forming a layered structure, and
wherein the porous carbon consists of carbon.

2. The porous carbon according to claim 1, wherein the specific surface area is 200 $m^2/g$ or more.

3. The porous carbon according to claim 1, wherein the mesopores are open pores, and the hollow portions are connected to each other.

4. The porous carbon according to claim 1, wherein the capacity of the mesopores is 0.2 ml/g or more.

5. The porous carbon according to claim 1, wherein the bulk density is from 0.1 g/cc to 1.0 g/cc.

6. The porous carbon according to claim 1, wherein the thickness of the portion forming a layered structure is from 1 nm to 100 nm.

7. A porous carbon comprising:
mesopores,
a carbonaceous wall constituting an outer wall of the mesopores, the carbonaceous wall forming a mesh three-dimensional network structure, and
micropores,
wherein the micropores are each formed in a position facing the mesopores in the carbonaceous wall,
wherein a peak is present at a Bragg angle 2θ of 26.45° in an X-ray diffraction spectrum to a CuKα ray (wavelength 1.541 angstroms) of the carbonaceous wall, and
wherein the porous carbon consists of carbon.

8. The porous carbon according to claim 7, wherein the specific surface area is 200 $m^2/g$ or more.

9. The porous carbon according to claim 7, wherein the mesopores are open pores, and the hollow portions are connected to each other.

10. The porous carbon according to claim 7, wherein the capacity of the mesopores is 0.2 ml/g or more.

11. The porous carbon according to claim 7, wherein the bulk density is from 0.1 g/cc to 1.0 g/cc.

12. The porous carbon according to claim 7, wherein the carbonaceous wall has a portion forming a layered structure.

13. The porous carbon according to claim 7, wherein the specific resistance is $1.0\times10^2$ Ω·cm or less.

14. A method of manufacturing a porous carbon consisting of carbon, the porous carbon having a three-dimensional network structure, wherein
a noncrystalline carbonaceous carbonized body having mesopores is manufactured by the steps of: mixing a flowable material containing an organic resin with template particles comprising at least one alkaline-earth metal compound selected from the group consisting of an oxide, a hydroxide, a carbonate and an organic acid salt of an alkaline-earth metal, to prepare a mixture; carbonizing the mixture in a non-oxidizing atmosphere to prepare a carbonized substance; and removing the template particles in the carbonized substance to obtain the noncrystalline carbonaceous carbonized body having mesopores, wherein the carbon yield of the flowable material is from 40% to 85%,
the noncrystalline carbonaceous carbonized body having mesopores is subjected to a crystallization treatment to heat a target in a non-oxidizing atmosphere or a reduced-pressure atmosphere at a temperature equal to or higher than a temperature at which the noncrystalline carbonaceous carbonized body having mesopores is crystallized, thereby obtaining the porous carbon comprising: the mesopores; a carbonaceous wall constituting an outer wall of the mesopores, the carbonaceous wall forming the three-dimensional network structure, the carbonaceous wall having a portion forming a layered structure; and micropores each formed in a position facing the mesopores in the carbonaceous wall.

15. The method of manufacturing a porous carbon according to claim 14, the diameters of the template particles are substantially the same as each other.

16. The method of manufacturing a porous carbon according to claim 14, wherein the flowable material shows flowability at a temperature of 200° C. or lower.

17. The method of manufacturing a porous carbon according to claim 14, wherein the flowable material is at least one selected from the group consisting of a polyimide containing at least one nitrogen or fluorine atom in its unit structure, a phenolic resin and a pitch.

18. The method of manufacturing a porous carbon according to claim 14, wherein in the step of removing the template particles, the remaining ratio of the template particles after the removing is restricted to 0.5% or less.

19. The porous carbon according to claim 1, wherein the capacity of the micropores is 0.12 ml/g or more.

20. The porous carbon according to claim 7, wherein the capacity of the micropores is 0.12 ml/g or more.

21. The method of manufacturing a porous carbon according to claim 14, wherein the crystallization treatment is conducted at a temperature of 2000° C. or lower.

22. The porous carbon according to claim 12, wherein the thickness of the portion forming a layered structure is from 1 nm to 100 nm.

23. A porous carbon comprising:
mesopores,
a carbonaceous wall constituting an outer wall of the mesopores, the carbonaceous wall forming a mesh three-dimensional network structure, and
micropores,
wherein the micropores are each formed in a position facing the mesopores in the carbonaceous wall,
wherein the carbonaceous wall has a portion being graphitized,
wherein the porous carbon consists of carbon, and
wherein the capacity of the micropores is 0.12 ml/g or more.

24. The porous carbon according to claim 23, wherein the specific surface area is 200 $m^2/g$ or more.

25. The porous carbon according to claim 23, wherein the mesopores are open pores, and the hollow portions are connected to each other.

26. The porous carbon according to claim 23, wherein the capacity of the mesopores is 0.2 ml/g or more.

27. The porous carbon according to claim 23, wherein the bulk density is from 0.1 g/cc to 1.0 g/cc.

* * * * *